United States Patent
Doi et al.

(10) Patent No.: US 6,488,813 B2
(45) Date of Patent: Dec. 3, 2002

(54) BLOCKED URETHANE PREPOLYMERS AS PAPER WET STRENGTH AGENT

(75) Inventors: Takeshi Doi, Oumihachiman (JP); Naofumi Saiuchi, Yasu-gun (JP); Masahiro Kouchi, Ikoma-gun (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/917,764

(22) Filed: Jul. 31, 2001

(65) Prior Publication Data

US 2002/0088583 A1 Jul. 11, 2002

(30) Foreign Application Priority Data

Aug. 1, 2000 (JP) .......................... 2000-232585

(51) Int. Cl.⁷ .................... D21H 17/57; D21H 21/20
(52) U.S. Cl. .................... 162/164.6; 162/165; 162/158; 162/179
(58) Field of Search .............................. 162/158, 168.1, 162/168.2, 164.6, 164.1, 165, 135, 136, 179, 169; 427/361, 391

(56) References Cited

U.S. PATENT DOCUMENTS

| 3,238,010 A | * | 3/1966 | Habib et al. ................ 8/115.6 |
| 3,346,445 A | * | 10/1967 | Gay ............................ 162/136 |
| 3,519,478 A | * | 7/1970 | Howell ........................ 427/391 |
| 3,583,943 A | * | 6/1971 | Weber et al. ................. 528/45 |
| 3,627,719 A |   | 12/1971 | Sellet |
| 3,694,389 A | * | 9/1972 | Levy .......................... 524/765 |
| 3,833,525 A | * | 9/1974 | Orlando et al. ............. 521/128 |
| 3,971,764 A |   | 7/1976 | Schurmann et al. |
| 4,239,878 A |   | 12/1980 | Hirako et al. |
| 5,013,838 A |   | 5/1991 | Scholl |
| 5,503,714 A |   | 4/1996 | Reiners et al. |
| 5,696,291 A |   | 12/1997 | Baranowski et al. |
| 5,738,912 A |   | 4/1998 | Koenig et al. |

FOREIGN PATENT DOCUMENTS

| EP | 0 0170 598 | * | 10/1980 |
| GB | 2 068 034 | * | 8/1981 |
| GB | 2093491 A |   | 9/1982 |
| JP | 5-51896 | * | 2/1993 |

* cited by examiner

*Primary Examiner*—Jose Fortuna
(74) *Attorney, Agent, or Firm*—Millen, White, Zelano & Branigan, P.C.

(57) ABSTRACT

Paper with increased wet strength is produced by adding to the stock a water soluble blocked urethane prepolymer having a plurality of blocked isocyanate groups and hydrophilic groups. The blocking agent is a phenol compound having an electron-attracting group at the ortho- or para-position. The blocked urethane prepolymer is capable of unblocking under such conditions that encounter in the drying part of conventional paper making machines.

20 Claims, No Drawings

BLOCKED URETHANE PREPOLYMERS AS PAPER WET STRENGTH AGENT

FIELD OF THE INVENTION

This invention relates to the use of blocked urethane prepolymers as wet strength agent to be added to the stock to obtain paper with increased strength in the wet state. It also relates to a process for making paper with increased wet strength including the addition of a blocked urethane prepolymer to the stock.

BACKGROUND OF THE INVENTION

Paper comprises, in addition to cellulose fiber, a variety of additives such as fillers, strength agents and the like. Wet strength agents are an additive which gives paper having increased strength in the wet state. Examples of widely used wet strength agents include urea resins, melamine resins, dialdehyde starch, polyethyleneimine, epoxylated polyamide etc.

Recently, several attempts have been made to use polyurethanes and urethane prepolymers as wet strength agent. JP-A-06173196 discloses use of a urethane prepolymer containing tertiary amine or quaternary ammonium moieties without blocking the free isocyanate groups. The prepolymer is either added into the stock or applied to webs formed therefrom in the form of an aqueous dispersion or emulsion. GB 2068034A discloses use of a urethane prepolymer amine salt as wet strength agent. The prepolymer amine salt is produced by blocking a urethane prepolymer having free isocyanate groups with a ketoxime, and reacting the blocked urethane prepolymer with a polyfunctional amine to give amine containing-blocked urethane prepolymer followed by dissolving the reaction product in water in the form of an acid addition salt. This amine salt is either added to the stock or applied to a web formed therefrom. JP-A-05051896 discloses a wet strength agent of the type to be applied to a web or paper. The agent comprises a water-soluble urethane prepolymer blocked with sodium hydrogen sulfite or a water soluble urethane prepolymer blocked with ketoxime or other blocking agent which is solubilized by introducing a hydrophilic moiety using the reaction with dimethylolpropionic acid.

Urethane prepolymers containing free isocyanate groups are generally unstable in the presence of water. Blocked urethane prepolymers, on other hand, require heating for unblocking. For blocked urethane prepolymers to be added in the stock, it is imperative to be unblocked under conditions to be encounted in the dryer part of paper making machines (up to 130° C. in several minutes).

A need exists, therefore, a water-soluble blocked urethane prepolymer which, when added in the stock as wet strength agent, is capable of unblocking under conditions to be normally encountered in the dryer part of paper making machines.

SUMMARY OF THE INVENTION

The present invention relates to the use of a water-soluble blocked urethane prepolymer as paper wet strength agent. According to the present invention, said blocked urethane prepolymer is blocked with a phenolic compound having an electron-attracting group at the ortho- or para-position. This blocking agent is capable of unblocking at a temperature lower than the unblocking temperature of oximes and, therefore, water-soluble urethane prepolymer blocked therewith may be used for producing paper with increased wet strength by adding in the stock without need for modifying conventional or existing paper making machines.

The present invention provides, therefore, a method for making paper with increased wet strength comprising:

adding a water-soluble, blocked urethane prepolymer having a hydrophilic group and a blocked isocyanate group blocked with a phenolic compound having an electron-attracting group at the ortho- or para-position to the stock, forming a web from the stock, and drying the web at a temperature up to 130° C.

Suitable examples of said phenolic compounds include p-hydroxybenzoic acid, esters thereof, salicylic acid and esters thereof. They are used as preservative of foods and pharmaceutical preparations due to their safety to human beings. Accordingly, the presence thereof in paper is out of concern if they are produced by the unblocking reaction of the blocked prepolymer and remain in paper. Also, if they are contained in the effluent from paper mills, the ecological affects thereof are considered to be minimum.

DETAILED DISCUSSION

As is well-known in the art, urethane prepolymer are produced by reacting a polyisocyanate with a polyether or polyester polyol at an NCO/OH equivalent ratio greater than 1. Examples of the starting polyether polyols, polyester polyols and polyisocyanates are all well-known in the polyurethane industry. Any of known materials may be used in the present invention.

Examples of suitable polyether polyols include those having a functionality of at least three and a molecular weight from 1,000 to 50,000. These polyether polyols may be prepared starting from a polyhydric alcohol such as glycerine, trimethylol propane, pentaerythritol and the like as an initiator by addition reaction with an alkylene oxide such as ethylene oxide or propylene oxide in the presence of a basic catalyst.

The use of polyester polyols as polyol component of the urethane prepolymer is effective to increase the wet strength of paper. Polyester polyols are generally produced by reacting an dihydric alcohol with a dicarboxyl acid or its acid hydride. Examples of dihydric alcohols include ethylene glycohol, 1,4-butanediol, 1,6-hexanediol, 3-methyl-1,5-pentanediol, neopentyl glycol and other aliphatic glycols. Also included in usable dihydric alcohols are polyether polyols produced by the addition-polymerizing reaction of glycols or bifunctional phenols such as bisphenol A with ethylene oxide and/or propylene oxide and/or butylene oxide. Examples of dicarboxylic acids and acid anhydrides include adipic, terephthalic, isophalic or sebacic acid and maleic anhydride. Ring opening polymers of a lactone such as ε-caprolactone or a cyclic carbonate such as trimethylene-carbonate are included in the class of polyester polyols. Polyester polyols having a functionality greater than two may be produced by using a polyhydric alcohol having a functionality greater than two as a portion of the alcoholic component.

The starting polyisocyantes are preferably non-yellowing polyisocyanates, namely polyisocyanates not containing an aromatic ring. Examples thereof include aliphatic diisocyanates such as hexamethylenediisocyanate, alicyclic diisocyanates such as isophoronediisocyanate, dimers, trimers or adducts thereof with a polyhydric alcohol such as trimethylolpropane.

A first method for introducing a hydrophilic group into the blocked urethane prepolymer comprises the steps of reacting a portion of free isocyanate groups in the urethane prepolymer produced from a polymer polyol component and a polyisocyanate component with a hydrophilic group-introducing active hydrogen compound (hydrophilic group precursor), and then reacting said phenolic blocking agent to block the remaining free isocyanate groups.

The urethane prepolymer must have a free isocyanate content of at least 2% by weight and preferably from 5 to 10% by weight. A portion of the free isocyanate content is consumed by the reaction with the hydrophilic group-introducing active hydrogen compound. A number of such active hydrogen compounds are disclosed in JP-A-06017196, GB 2068034A and JP-A-05051896 cited above. Any of disclosed active hydrogen compounds may be used in the present invention. However, preference is made to an aliphatic active hydrogen compound having a tertiary amino group and an active hydrogen-containing group such as hydroxyl or primary amino group. Typical examples thereof are N,N-dimethyldiethanolamine, N,N-dimethylethylenediamine or their homologs. Dihydric tertiary aminoalcohols are preferable. The hydrophilic precursor compound is bound to the urethane prepolymer by the reaction between the active hydrogen-containing group thereof and a portion of the free isocyanate groups of the urethane prepolymer. The remainder of free isocyanate groups is then blocked with a blocking agent disclosed herein. The water-soluble blocked urethane prepolymer is prepared by quaternization of bound tertiary amino group with a quaternizing agent such as dimethyl sulfate. Alternatively, the bound tertiary amino group may be neutralized with a suitable acid to solubilize the blocked urethane in the form of an acid addition salt. Solubilization in the form of a quaternary ammonium salt is preferable. This is because it does not need for an acid for solubilization and, therefore, the stock may be prepared in neutral to basic regions.

The ratio of the hydrophilic group-introducing active compound to the urethane prepolymer must be sufficient to render the urethane prepolymer water-soluble but not sufficient to block all of free isocyanate groups in order that at least a portion of free isocyanate groups remain unreacted. This ratio naturally varies depending on the nature of the starting polyol and polyisocyanate components of the urethane prepolymer and also on the type of a particular hydrophilic group-introducing active compound employed. This ratio generally lies between 10% and 50% equivalents relative to the free isocyanate content of the urethane prepolymer.

The balance of free isocyanate content of the urethane prepolymer is blocked with a phenolic compound having an electron-attracting group at the ortho- or para-position. A phenolic compound having an amino group at the designated position is excluded from the blocking agent used in the present invention. This is because amino group irreversibly forms a urea linkage by the reaction with a free isocyanate group and the reaction dose not fall in the usual sense of "blocking". Phenols having an electron-attracting group such as trifluoromethyl, nitro, cyano, acetyl, alkoxycarbonyl, carboxyl or alkylsulfonyl group at the designated position may be used. Examples of most preferable electron-attracting groups include free or esterified carboxyl group. Examples of specific compounds having such electron-attracting groups are p-hydroxybenzoic acid, esters thereof, salicylic acid and esters thereof. They are in use in foods, cosmetics or pharmaceutical preparations as a preservative or analgesic due to safety to human beings and the environment. Accordingly, safety concern is minimum if the preferred blocking agent remains in paper or is contained in the effluent from the paper mill.

A second method for introducing a hydrophilic group into the blocked urethane prepolymer includes to use a polyhydric alcohol having a tertiary amino group as a portion of the polyol component in the synthesis of the urethane prepolymer. Examples of suitable tertiary amino alcohols include N-methyldiethanolamine, N-ethyldiethanolamine and like N-alkyldialkanolamines. Triethanolamine could also be used. This method is especially suited where a polyester polyol is used as the polyol component in the synthesis of the urethane prepolymer. If the polyol component comprises a bifunctional tertiary amino alcohol and a bifunctional polyester polyol, then a urethane prepolymer having a functionality greater than two may be produced by incorporating into the reaction system a low molecular weight polyhydric alcohol having a functionality greater than two such as glycerine or trimethylolpropane. In this case, the NCO/OH equivalent ratio of the polyisocyanate component must be excess of 1 relative to the sum of OH groups possessed by the polyether polyol, polyester polyol, polyfunctional tertiary amino alcohol and the low molecular weight polyhydric alcohol having a functionality greater than two.

All of free isocyanate groups of the resulting urethane prepolymer having a hydrophilic group or a precursor group thereof are blocked with the blocking agent mentioned above with regard to the first method and then the precursor group (tertiary amino group) is quarternized with a quaternizing agent such as dimethyl sulfate or neutralized with a suitable acid as in the first method to give a water-soluble blocked urethane prepolymer having a hydrophilic group and a blocked isocyanate group.

The water-soluble blocked urethane prepolymer of the present invention is added in the stock together with other additives such as filler. The stock is then processed, as in the conventional paper making process, through the wire section, the press section and the dryer section to give paper having increased wet strength. The paper is dried by passing a series of cylinders which are heated usually to a maximum temperature up to 130° C. . The water-soluble blocked urethane prepolymer of the present invention may be fully unblocked under the above heating conditions to regenerate reactive urethane prepolymer in situ which serves as binder to strengthen the binding of fibers. The water-soluble blocked urethane prepolymer could also find use as wet strength agent to be applied onto ready-made paper or webs as in the case of sizing agent.

The amount of the blocked urethane prepolymer of the present invention to be added to paper may vary depending on the desired strength property in the finished paper and generally ranges from 0.1% to 5% by weight as solids based on dry weight of fiber (pulp). This amount may be increased in excess of 5% by weight where higher wet strength is desirable.

EXAMPLES

The following examples illustrate the present invention without limiting thereto. All parts and percents therein are by weight unless otherwise indicated.

Example 1

300 parts of polyether polyol having an average molecular weight of 3,000 prepared by random addition of ethylene oxide and propylene oxide at 70:30 to glycerine and 50.4 parts of hexamethylenediisocyanate were reacted at 100° C.

for 150 minutes to give a urethane prepolymer having a free isocyanate content of 6.4% (calculated from charged reactants). The reaction product was cooled down to 70° C. and 8.9 parts of N,N-dimethylethanolamine were added thereto. The mixture was kept at 70° C. for 105 minutes with stirring whereupon the free isocyanate content decreased to 2.3%. The reaction mixture was further cooled down to 50° C. and 27.6 parts of p-hydroxybenzoic acid were added thereto. After the addition, the mixture was allowed to react at an inner temperature of 70° C. for 120 minutes.

After confirming the absence of free isocyanate content, the reaction product was quaternized with 12.6 parts of dimethyl sulfate at 70° C. for 180 minutes followed by dilution with 600 parts of water. A clear, viscous solution of thermally reactive blocked urethane prepolymer solution containing 40% solids was obtained.

Example 2

Example 1 was followed except that 38.8 parts of butyl p-hydroxybenzoate were replaced for p-hydroxybenzoic acid. A clear viscous solution of thermally reactive blocked urethane prepolymer containing 40% solids was obtained.

Example 3

Example 1 was followed except that 27.6 g of salicylic acid were replaced for p-hydroxybenzoic acid. A clear, viscous solution of thermally reactive blocked urethane prepolymer containing 40% solids was obtained.

Example 4

200 parts of polyester polyol having an average molecular weight of 1,000 produced by the polycondensation of adipic acid and 1,4-butanediol, 5 parts of trimethylolpropane, 20 parts of N-methyldiethanolamine and 96 parts of hexamethylenediisocyanate were reacted at 50° C. for 120 minutes to give a urethane prepolymer having a free isocyanate content of 3.6% (calculated from charged reactants). After cooling to 30° C. 55 parts of butyl p-hydroxybenzoate were added to the reaction product. The mixture was then allowed to react at 60° C. for 90 minutes. After confirming the absence of free isocyanate content, the reaction product was quaternized with 46.2 parts of dimethyl sulfate at 55° C. for 30 minutes followed by dilution with 1,200 parts of water. A semi-transparent, pale white solution of thermally reactive blocked urethane prepolymer containing 20% solids was obtained.

Example 5

150 parts of polyester polyol having an average molecular weight of 1,000 produced by the polycondensation of adipic acid and 1,4-butanediol, 50 parts of polyethylene glycol having an average molecular weight of 1,000, 5 parts of trimethylol propane, 20 parts of N-methyldiethanolamine and 96 parts of hexamethylenediisocyanate were reacted at 50° C. for 120 minutes to give a urethane prepolymer having a free isocyanate content of 3.5% (calculated from charged reactants). After cooling to 30° C. 55 parts of butyl p-hydroxybenzoate were added to the reaction product. The mixture was then allowed to react at 60° C. for 90 minutes. After confirming the absence of free isocyanate content, the reaction product was quaternized with 46.2 parts of dimethyl sulfate at 55° C. for 30 minutes followed by diluting with 1,200 parts of water. A clear, pale brown solution of thermally reactive urethane prepolymer containing 20% solids was obtained.

Comparative Example 1

Example 1 was followed except that 18.8 parts of phenol was replaced for p-hydroxybenzoic acid. A clear, viscous solution of blocked urethane prepolymer containing 40% solids was obtained.

Comparative Example 2

Example 1 was followed except that 17.4 parts of butanone oxim (methyl ethyl ketoxim) were replaced for p-hydroxybenzoic acid. A solution of blocked urethane prepolymer containing 40% solids was obtained.

Paper Making Test

The paper making test was carried out according to JIS P 8209-1961 as follows.

135. 3 g of NBKP (Needle-leaved Bleached Kraft Pulp) was shredded into about 3 cm square pieces and soaked in 1668.7 g of water overnight, and beated in a standard beater for 3 hours to a Canadian Standard freeness of 527 ml ( 20° C. , 0.3%) to obtain a pulp slurry of 7.5% concentration. 400 g of this pulp slurry and 6 g of 5% solution of the blocked urethane prepolymer prepared in Examples and Comparative Examples were added to 594 g of water and the mixture was adjusted to pH 8.0 with sodium hydrogen carbonate to give a stock having a pulp concentration of 3%.

32 g of the resulting stock was subjected to sheet making in a sheet machine, pressed in a press machine at a pressure of 3.5 g/m$^2$ for 5 minutes, air dried at 20° C. at a relative humidity of 65%, and finally heat dried at 120° C. for 5 minutes to prepare sample paper of a basis weight of 50 g/m$^2$.

The sample paper was cut into 11 cm×1.5 size and attached to a standard autograph tensile test machine with clamp-to-clamp distance of 5 cm. The central area of the paper piece was wetted with water using a blush and tested for wet tensile strength. As blank control, paper not containing any wet strength agent was used.

In Comparative Example 3, a commercially available polyamide-epichlorohydrine based wet strength agent was added at 1% by dry weight of pulp in the same manner as Example 1 by adding 6 g of 5% aqueous dispersion of the wet strength agent and 400 g of 7.5% pulp slurry to 594 g of water. The results are shown in the table below.

| Wet Strength Agent | % Addition Relative to The Dry Weight of Pulp | Wet tensile Strength (kg/cm) |
| --- | --- | --- |
| Example 1 | 1 | 0.69 |
| Example 2 | 1 | 0.72 |
| Example 3 | 1 | 0.71 |
| Example 4 | 1 | 1.28 |
| Example 5 | 1 | 1.20 |
| Blank Control | 0 | 0.21 |
| Comparative Ex. 1 | 1 | 0.20 |
| Comparative Ex. 2 | 1 | 0.21 |
| Comparative Ex. 3 | 1 | 0.67 |

It will be appreciated from the above table, the blocked urethane prepolymers of the present invention are effective as wet strength agent having performance comparable to or better than the commercially available polyamide-epichlorohydrine based wet strength agent. Phenol or ketoxime blocked urethane prepolymers of Comparative Examples 1 and 2 are, however, are not effective as wet strength agent because they are not unblocked under the above heating or drying condition. Therefore, these blocked urethane prepolymer are not suited to the wet strength agent of the type to be added in the stock.

What is claimed is:

1. A process for making paper with increased wet strength comprising:

adding a water-soluble, blocked urethane prepolymer having a hydrophilic group and a blocked isocyanate group blocked with a phenolic compound having an electron-attracting group of trifloromethyl, nitro, cyano, acetyl, alkoxycarbonyl, carboxyl or alkylsulfonyl at the ortho- or para-position to the stock, forming a web from the stock, and drying the web at a temperature up to 130° C.

2. A process according to claim 1 wherein said phenolic compound is selected from the group consisting of p-hydroxybenzoic acid, esters thereof, salicylic acid and esters thereof.

3. A process according to claim 1 wherein said hydrophilic group is an acid-neutralized or quarternized tertiary amino group.

4. A process according to claim 1 wherein said water-soluble blocked urethane prepolymer is prepared by the steps of:

a) reacting a polyether or polyester polyol with a polyisocyanate at an NCO/OH equivalent ratio greater than 1 to obtain a urethane prepolymer having a plurality of free isocyanate groups;

b) reacting a portion of the free isocyanate groups of said urethane prepolymer with an active hydrogen compound having a tertiary amino group to introduce the tertiary amino group;

c) blocking the remaining free isocyanate groups of said urethane prepolymer with said phenolic compound; and d) quaternizing or neutralizing the tertiary amino group introduced in step b).

5. A process according to claim 4 wherein said active hydrogen compound having a tertiary amino group is a tertiary amino alcohol.

6. A paper product made by the process of claim 4.

7. A process according to claim 4, wherein the polyether polyol has a molecular weight of 1,000–50,0000.

8. A process according to claim 4, wherein the polyisocyanate does not contain an aromatic ring.

9. A process according to claim 8, wherein the polyisocyanate is an aliphatic diisocyanate, or alicyclic diisocyanate.

10. A process according to claim 1 wherein said water-soluble blocked urethane prepolymer is prepared by the steps of:

a) reacting a mixture of a polyether or polyester polyol and a polyhydric tertiary amino alcohol with a polyisocyanate at an NCO/OH equivalent ratio of greater than 1 to obtain a urethane prepolymer having a plurality of free isocyanate groups and a pendant tertiary amino group;

b) blocking all of said free isocyanate groups with said phenolic compound; and c) quaternizing or neutralizing said pendant tertiary amino group.

11. A process according to claim 10 wherein said polyhydric tertiary amino alcohol is N-alkyldialkanolamine.

12. A process according to claim 10 wherein said mixture in step a) further comprises a low molecular weight polyhydric alcohol having a functionality of greater than two.

13. A paper product made by the process of claim 10.

14. A process according to claim 10, wherein the polyhydric tertiary amino alcohol is N-methyldiethanolamine, N-ethyldiethanolamine, N-alkyldialkanolamine, or triethanolamine.

15. A process according to claim 1, wherein said water soluble, blocked urethane prepolymer is added in the stock in an amount from 0.1 to 5% by weight based on dry weight of fiber.

16. A paper product made by the process of claim 1.

17. A process according to claim 1, wherein the urethane prepolymer has a free isocyanate content of at least 2% by weight.

18. A process according to claim 1, wherein the electron attracting group is carboxyl.

19. A process according to claim 1 wherein said water soluble, blocked urethane prepolymer is added in the stock in an amount greater than 5% by weight based on dry weight of fiber.

20. A process according to claim 1 wherein said phenolic compound is butyl p-hydroxybenzoate.

* * * * *

UNITED STATES PATENT AND TRADEMARK OFFICE
CERTIFICATE OF CORRECTION

PATENT NO.    : 6,488,813 B2
DATED         : December 3, 2002
INVENTOR(S)   : Doi et al.

It is certified that error appears in the above-identified patent and that said Letters Patent is hereby corrected as shown below:

<u>Column 7,</u>
Line 11, change "trifloromethyl" to -- trifluoromethyl --.

Signed and Sealed this

Tenth Day of June, 2003

JAMES E. ROGAN
*Director of the United States Patent and Trademark Office*